US008201779B2

(12) United States Patent
Hua et al.

(10) Patent No.: US 8,201,779 B2
(45) Date of Patent: Jun. 19, 2012

(54) HOSE SUPPORT STRAP FOR RAILWAY CAR BRAKE LINE

(75) Inventors: Lin Hua, Jersey City, NJ (US); Xiaoxing Zhang, East Brunswick, NJ (US)

(73) Assignee: Strato, Inc., Piscataway, NJ (US)

( * ) Notice: Subject to any disclaimer, the term of this patent is extended or adjusted under 35 U.S.C. 154(b) by 321 days.

(21) Appl. No.: 12/617,280

(22) Filed: Nov. 12, 2009

(65) Prior Publication Data

US 2011/0107558 A1    May 12, 2011

(51) Int. Cl.
*F16L 3/00* (2006.01)

(52) U.S. Cl. ............................... 248/53; 713/76; 24/908

(58) Field of Classification Search ............... 248/75, 248/92, 499, 610, 53, 302, 301; 24/908, 24/601.3, 301, 300, 230.5, 197, 176, 237; 213/76

See application file for complete search history.

(56) References Cited

U.S. PATENT DOCUMENTS

| 180,432 | A | * | 8/1876 | Maxheimer | ............ 248/624 |
| 440,056 | A | * | 11/1890 | Pennington | ........... 24/601.1 |
| 472,962 | A | * | 4/1892 | Collins | ............. 24/601.1 |
| 2,064,744 | A | * | 12/1936 | Hall | ............ 40/664 |
| 2,820,269 | A | * | 1/1958 | Wolff | ............... 24/9 |
| 2,996,315 | A | * | 8/1961 | Roth et al. | ............. 285/2 |
| 3,263,879 | A | * | 8/1966 | Sanderson | ............ 224/103 |
| D208,358 | S | * | 8/1967 | Imai | ............... D8/382 |
| 3,335,472 | A | * | 8/1967 | Imai | ............ 24/601.1 |
| 3,592,425 | A | | 7/1971 | Randolph et al. | ........... 248/53 |
| 3,784,030 | A | | 1/1974 | Chierici | ............. 213/76 |
| 4,234,998 | A | * | 11/1980 | McMickle | ............ 24/601.3 |
| 4,986,500 | A | | 1/1991 | Campbell | ............ 248/53 |
| 6,422,521 | B1 | * | 7/2002 | Tinklepaugh et al. | ......... 248/75 |
| 7,631,774 | B2 | * | 12/2009 | Foxx et al. | ........... 213/76 |
| 2004/0155005 | A1 | * | 8/2004 | Murphy | ............ 213/76 |
| 2007/0227999 | A1 | | 10/2007 | Murphy | |
| 2007/0241240 | A1 | | 10/2007 | Murphy | ............ 248/60 |
| 2008/0223247 | A1 | | 9/2008 | Foxx | |

OTHER PUBLICATIONS

Notification of Transmittal of The International Search Report and The Written Opinion of the International Searching Authority, or the Declaration.
Association of American Railroads (AAR) Standard S-4006, effective Nov. 1, 2009—6 pages.

* cited by examiner

*Primary Examiner* — Kimberly Wood
(74) *Attorney, Agent, or Firm* — Brendan Mee Law, P.C.

(57) ABSTRACT

A hose strap for a railway car brake line having a flexible strap having a plurality of through holes and two clips attached to the strap. Each clip has a first leg and a second leg, which are offset from each other and curled at the ends. As a result of these innovations, the hose strap according to the invention has an improved reaction force, load support and lifespan.

11 Claims, 4 Drawing Sheets

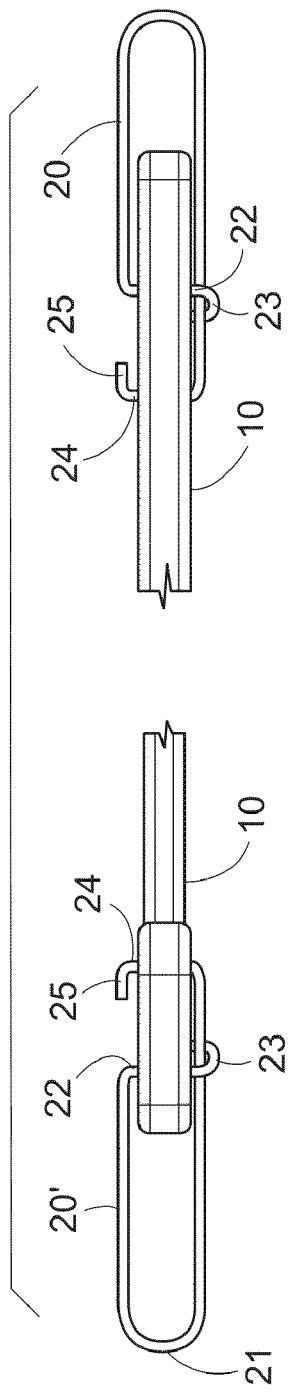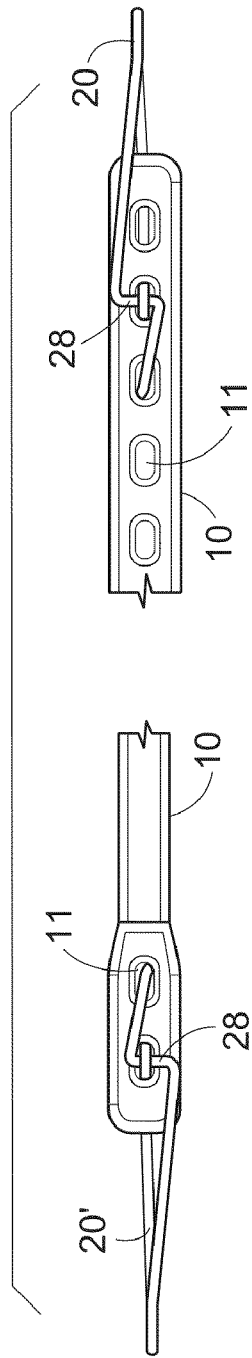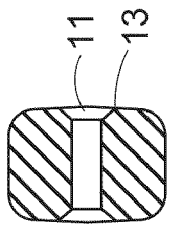

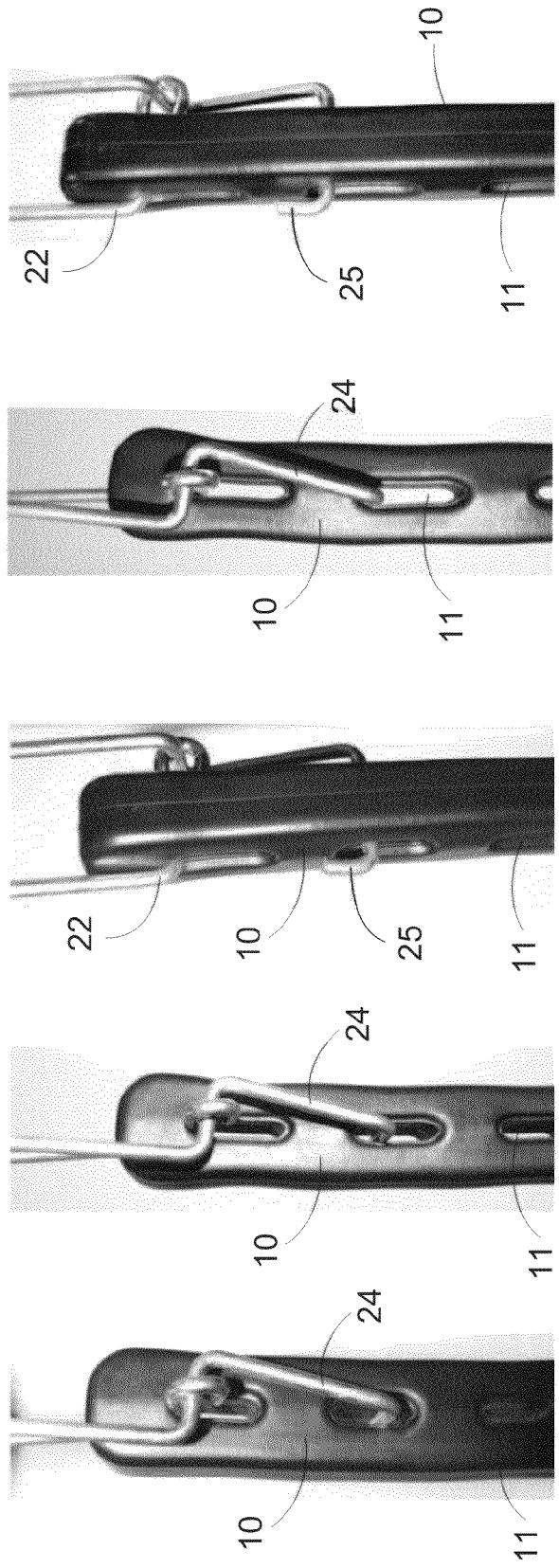

HOSE SUPPORT STRAP FOR RAILWAY CAR BRAKE LINE

BACKGROUND OF THE INVENTION

1. Field of the Invention

The invention is in the field of brake hose support systems for railway cars, and in particular, the invention is directed to a novel hose strap, adapted to engage with American Association of Railroads ("AAR") standard coupler heads and brake hose fittings.

2. Description of Related Art

In a railway car coupler system, a supporting device is used for suspending the glad hand of an air brake hose assembly from the couplers of railway vehicles. AAR standards specify a minimum distance between the ground and the glad hand fitting, so that the straps are made adjustable between a length of 16 inches and 22 inches. Conventionally, the supporting device, also called an air brake hose support or hose strap, was a metal chain whereby, one end of the chain could be connected to a fitting on the glad hand on the free end of the air hose and the other end could be connected to a fitting on the coupler of the railway vehicle.

When a glad hand fitting becomes decoupled, especially if the appropriate valves are not shut off, compressed air in the hose propels the glad hand, which in turn exerts a load on the strap, referred to herein as "reaction force." A chain support does not absorb this energy when the glad hand fitting is decoupled, causing increased reaction force. As a result, the full energy from the decoupling is delivered to the impact when the glad hand fitting strikes the car or other machinery. The chain and connectors are also susceptible to breakage, which can lead to the air hose being pulled along the trackway, or to the glad hand being caught in wayside equipment resulting in damage to the air brake hose assembly.

Rubber air brake hose supports are also known in the prior art which absorb energy generated from hose separations better than metal chain air brake hose supports. A rubber strap stretches to absorb energy, thereby reducing the reaction force when hoses are decoupled. A rubber air brake hose support exhibits much less reaction force as compared to a metal chain under the same hose separation conditions.

Some examples of flexible air brake hose supports are shown and disclosed in U.S. Pat. No. 3,592,425, U.S. Pat. No. 3,784,030, and U.S. Pat. No. 4,986,500. These air brake hose supports have a flexible strap having a plurality of holes with a fastening system at each end thereof including metal clips. The clips can be moved to engage different holes on the strap to adjust the length.

It has been found, however, with the current designs of rubber hose straps, that failure often originates where the metal clips meet the holes in the flexible member. Where clips have been provided having two legs in adjacent holes on the strap, the holes on the flexible member have been spaced so that only the leg closer to the load bears significant load during use, and the leg farther from the load is prone to pulling out of the hole when load is applied. When a second leg pulls out of the hole, or if the air brake hose support has only one leg on the clip threaded though the flexible strap to begin with, the clip can rotate and cause lateral loading, which is another common cause of failure.

While the prior art air brake hose supports function satisfactorily under normal conditions, there are still problems with reaction force and load support. These field problems have caused the Association of American Railroads (AAR) to adopt a new standard, S-4006, effective Nov. 1, 2009.

The present invention is directed to an improved hose strap having a flexible strap and associated clips, which addresses the problems long recognized in the prior art, while meeting or exceeding the new AAR standards.

SUMMARY OF THE INVENTION

A hose strap for a railway car brake line according to the present invention comprises: a flexible strap having a plurality of substantially identical oblong through holes positioned in a row lengthwise along the strap so that a longitudinal axis of the oblong through holes coincides with a longitudinal axis of the strap. Two one-piece metal clips are attached respectively to opposite ends of the strap. Each clip comprises a first leg and a second leg extending from a major bend and extending completely through adjacent through holes in the strap. The distance between the first and second leg is greater than the distance between identical points on two adjacent through holes.

In the most preferred embodiments, the first leg of each clip extends through a through hole and bends around the second leg in a direction away from the major bend and toward the flexible strap. The second leg of each clip extends through a through hole and bends about 90 degrees in a direction toward the major bend of the clip.

BRIEF DESCRIPTION OF THE DRAWINGS

FIGS. 2A and 2B are side sectional views of two clips for attaching a hose strap.

FIG. 2C is a cross-sectional view of the strap.

FIGS. 4A, 4B, 4C, 4D and 4E show a brake hose support according to the present invention in various stages after application of a load.

DETAILED DESCRIPTION OF THE INVENTION

The present invention is directed toward a hose strap, which is comprised of a flexible strap and two clips, which meets or exceeds the dimensions and standards set forth in AAR Manual of Standards and Recommended Practices S-4006, "Performance Testing of Air Brake End Hose Supports," 2008 revision (implemented in 2009), incorporated herein by reference.

Figure 1:
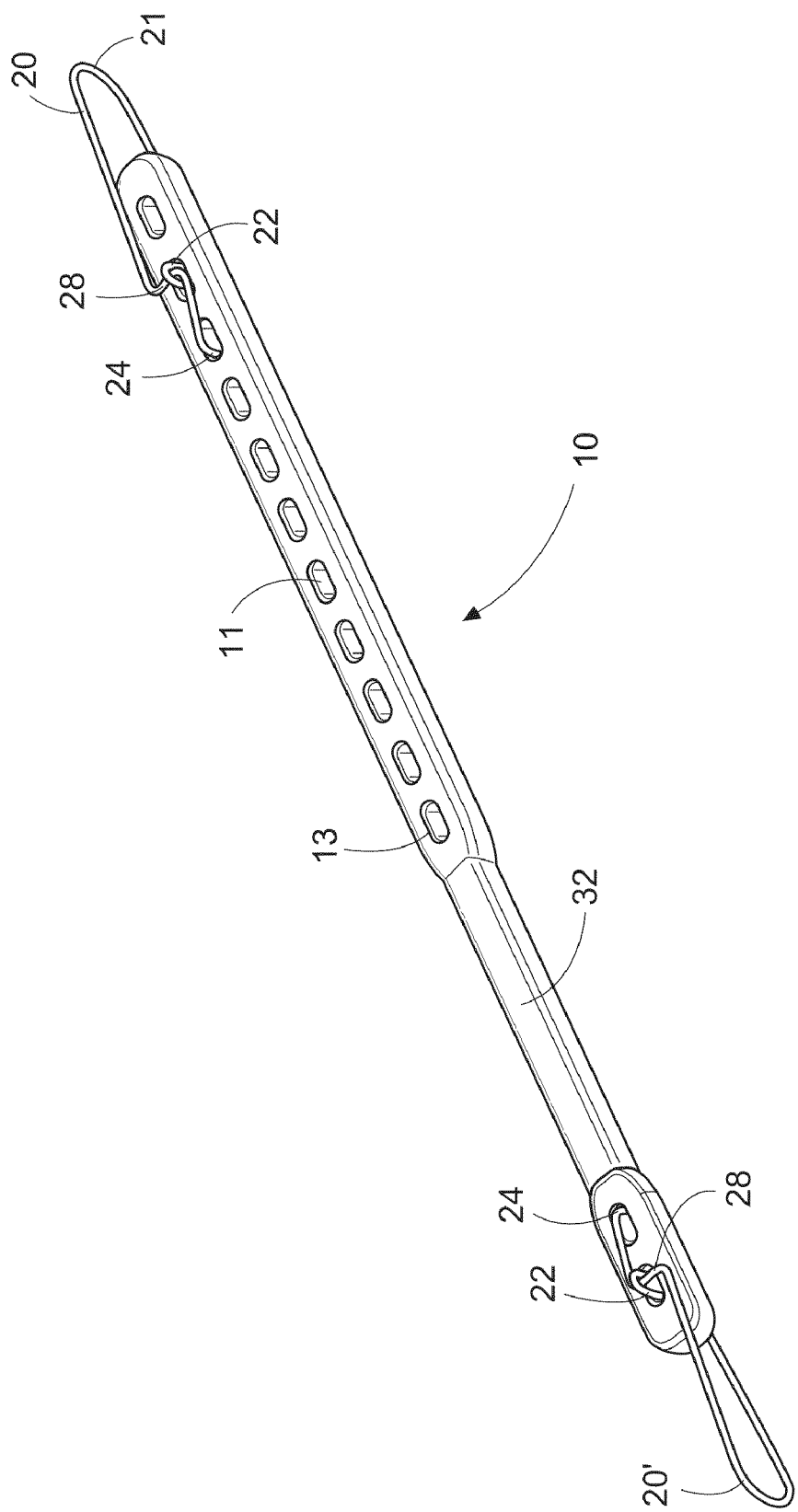
FIG. 1 is a perspective view of a hose strap according to the invention.

As seen in FIG. 1, a hose strap for a railway brake line system of the present invention includes a flexible strap 10 having a plurality of through holes 11 extending through and positioned in a row along the longitudinal axis of the strap. In the embodiment shown, on the end of the strap that is attached to the coupler head, eleven through holes are positioned in a row. Thus, in the embodiment shown, the strap may be adjusted to any one of ten different length settings by moving clip 20 to different through holes. In other embodiments, the row may comprise between six and twelve through holes, because AAR standards require adjustability. In the embodiment shown, at the opposite end of the strap, which is attached to the glad hand of the brake hose, a single pair of through holes attaches to clip 20'. However, more than two holes can be provided at the glad hand end, if desired. Also, in some instances, the clip closer to the glad hand may be attached to the row of holes that begins closer to the coupler head.

In a preferred embodiment, a hose strap according to the invention has an intermediate portion 32 between the rows of holes at opposite ends. The intermediate portion preferably has a substantially rectangular cross section.

The through holes 11 are oblong, having a length in a direction of the longitudinal axis longer than their width. In preferred embodiments, the through holes 11 have a beveled edge 13, which facilitates insertion of the legs of the two clips 20, 20'. Preferably, the shape of the through holes is substantially identical.

AAR standards require the strap to be adjustable in increments of no more than one inch. Thus, the distance between identical points on adjacent through holes is preferably one inch or less. The length of each of the through holes is in a range of about 0.25 inches to about 0.8 inches, depending on the elasticity of the strap and the load that will be applied, and in the most preferred present embodiment is about 0.45 inches to about 0.60 inches. The distance between the closest points of two adjacent holes is about 0.2 inches to about 0.75 inches, provided the distance between identical points of the through holes is one inch or less. The distance between the legs of the clip is greater than one inch, preferably about 1.2 inches to about 1.75 inches, so that in an initial state, prior to engagement of the hose strap, when the first leg abuts the side of the through hole in the direction of the applied load, the second leg does not abut the wall of the adjacent through hole in the direction of the applied load.

FIG. 2A and FIG. 2B are sectional views which depict the details of the attachment of the clips 20, 20' to the strap 10 via through holes 11. Each clip has a major bend 21, which in operation is looped around a fixture on the coupler head (not shown) or a fixture on the air brake hose coupling (not shown), as the case may be, so that a load is applied to the strap 10 by a force applied at major bend 21. Each clip has a first leg 22 and a second leg 24, which preferably are offset by a turn 28 in the clip 20. The first leg 22 and the second leg 24 are spaced apart such that they can be easily inserted into two consecutive openings 11. The first leg 22 and the second leg 24 extend from the major bend 21 and extend completely through adjacent through holes 11 in the strap. As seen in FIG. 2A and FIG. 2B, the distance between the first and second leg along the longitudinal axis is greater than the distance between identical points on two adjacent through holes. Thus, before any load is applied to the strap, the first leg 22 abuts the side of through hole 11 in a direction of the load, but the second leg does not contact the corresponding side of the next adjacent through hole. After considerable force has been applied, the rubber yields before the metal wire, and the clip is displaced in the direction of the load. Thereafter, the second leg 24 contacts the side of the through hole 11 in the direction of the load and the second leg becomes load bearing. This arrangement of elements is in distinction to the prior art, wherein a second leg, if any, provides little or no weight bearing, and only imperfect positioning function.

The first leg 22 of each clip extends completely through a through hole and bends around the second leg in a direction away from the major bend and toward the flexible strap. Where the bend 28 in the second leg meets the bend 23 in the first leg, the first and the second leg are oriented at approximately 90 degrees with respect to each other. In this way, the first leg 22, where it extends completely through the through hole 11, forms a simply supported beam which supports the side of the through hole in the direction of the applied force, because the force is applied on both legs, on both sides of the strap. The simply supported beam is a stronger support than the cantilevered beam used in many prior art clips. The second leg of each clip extends completely through an adjacent through hole and bends about 90 degrees in a direction toward the major bend of the clip. This bend 25 prevents the second leg from pulling out of the through hole 11 when force is applied at the major bend 21 of the clip.

As shown in FIGS. 2A and 2B, the second leg 24 is curled at an end 25 to secure the clip 20 to flexible strap 10 when a load is applied. As shown in FIG. 2C, the openings 11 are oblong and is provided with a beveled edge 13 for better attachment to the legs of the clip leading to improved reaction force, load support and lifespan. As seen in the cross sectional view of FIG. 2C, the strap is thicker at the longitudinal axis than at the sides, i.e., thicker at the hole than at the sides, thickness being measured in a direction perpendicular to the longitudinal axis of the flexible strap.

As shown in FIG. 1, the clips of the present invention have two legs extending from a major bend with curled ends which secure the strap in place and prevent rotation and lateral loading. The bend 28, in addition to improving the load bearing, causes the two legs to be offset at an angle. These features together decrease lateral loading and decreases the stress placed on each through hole of the strap through which the legs are threaded and allows for increased maximum failure strength and longer life. Longer life, in turn, reduces maintenance and replacement costs.

Another advantage of the present design is improved cold-weather performance. As noted above, a hose strap that is more flexible will exhibit reduced reaction forces. Flexibility of rubber materials is partly a function of temperature, with flexibility increasing at higher temperatures. The present hose strap is less prone to failure at low temperatures, even with the increased reaction forces experienced.

In operation, the significance of through holes being elongated and the distance between legs of the clip being greater than the distance between identical points on adjacent through holes is best seen in FIGS. 4A through 4E. FIG. 4A shows a clip inserted through adjacent through holes before a load is applied. In the lower through hole, before a load is applied, there is a distance between the side of the through hole toward the applied load and the second leg 24. This distance is preferably about 0.2 inches to about 0.75 inches, depending on the size and spacing of the through holes, as well as the elasticity of the strap and the load that will be applied. In FIG. 4B, after a load has been applied, the through hole closer to the applied load begins to elongate. One of ordinary skill in this art will appreciated that the rubber stretches more readily than the clip, and therefore the distance between the edges of the holes changes, while the distance between the legs of the clip remains substantially constant. FIG. 4C is a side view of FIG. 4B, showing bend 25 about to engage the edges of through hole 11, preventing the clip from being pulled out of the through hole 11 in a state before it is fully engaged. In FIGS. 4D and 4E, which are orthogonal views, the clip is fully engaged and the lower leg of the clip is fully weight bearing.

Figure 3:
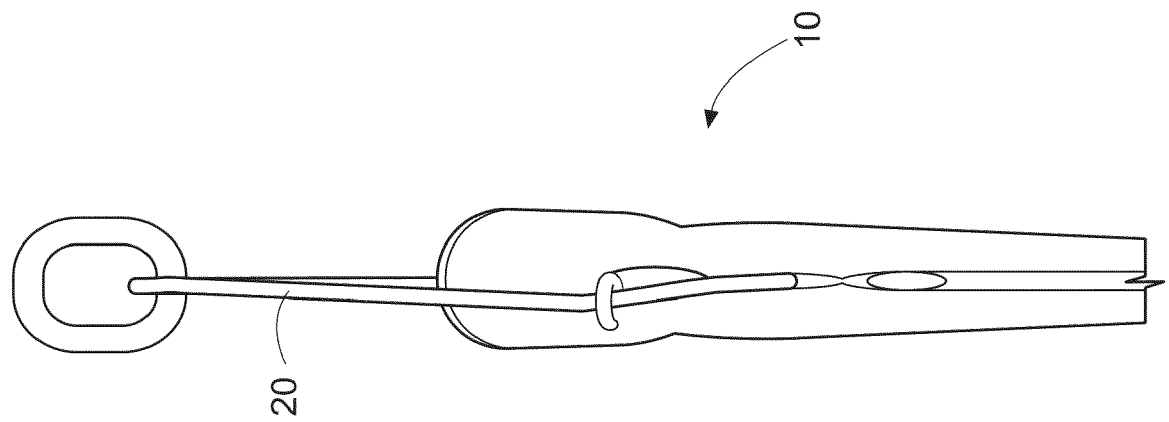
FIG. 3 depicts a side elevational view of a brake hose support according to the prior art wherein a leg of the clip has been disengaged from a hole in the flexible strap after application of a load.

FIG. 3 depicts a hose strap according to the prior art after a load has been applied, where the clip has two legs extending through adjacent through holes, but unlike in the present invention, the legs are spaced about the same distance as the through holes. As shown in FIG. 3, immediately after application of a load, the distance between adjacent holes begins to increase and soon leads to the lower clip slipping out of the through hole, with the result that most or all of the load is borne by the top leg, and the clip cuts into the rubber material of the strap.

The flexible strap is preferably made of rubber having a durometer hardness in a range of 60 to 95, most preferably about 82 to 88 durometer hardness. The thickness of the clips is not particularly limited, and may be selected based on overall strength, ease of opening and ability to fit in the through holes. In a current embodiment, the clips are made from metal wire having a diameter of 0.120 inches±0.007 inches. The clips should pass AAR anti-corrosion specifications, and may be made from stainless steel, or steel plated with zinc or other coating applied to make the metal more corrosion-resistant.

A hose strap according to the present invention also demonstrates an improved performance strength when subjected to reaction force, as compared to the prior art. Performance strength may be evaluated according to the Maximum Load Test set forth in AAR standard S-4006.

According to standard S-4006, under section 4.2 Load Tests, a hose strap is required to meet certain load requirements. Under Permanent Set Tests, the OAL length (the length of the strap plus the one end of the clip to the end of the other at the other end of the strap) of a test hose strap with 5 lbs attached is measured, "Initial Length," then a straight load pull of 25 lbs is attached to the test hose strap for 120 hours without stretching more than 1.0 inch. The load is then removed, the OAL length measured after a waiting period of less than 2 hours, "Length After 120 HR Load," and the length compared to the Initial Length. The difference between the Initial Length and the Length After 120 HR Load is known as the "Permanent Set" and should not exceed 0.5 inches.

For meeting the Maximum Load Tests, a flexible hose strap capable of stretching 10 or more inches must be able to lift 300 lbs off of the ground for a minimum of ten times without tearing in a period of 15-20 minutes. If the strap material is less flexible, and stretches less than 10 inches, the test is required to be conducted with a heavier weight, set forth in the standard. To determine the stretch, the hose strap is loaded vertically with a 5 lb weight and its OAL length measured as "Length Base Measurement." The 5 lb weight is removed and a 300 lb load is attached to the hose strap and the OAL length measured as "Length Under 300 lb." The difference between the two is the stretch. In the case of a strap material stretching at least 10 inches, the hose strap must be able to lift 300 lbs off of the ground for a minimum of ten times without tearing in a period of 15-20 minutes. As noted in the Standard, more rigid materials are subjected to higher test loads. The heavy load is then removed, and a 5 lb weight attached. The "Permanent Set" is then calculated by measuring the difference between the OAL length with the 5 lb weight attached and the Length Base Measurement. The Permanent Set must not exceed 0.5 inches.

A hose strap according to the present invention was tested for permanent set and maximum load according to AAR Standard S-4006 and was found to exceed the requirements. Four sample hose straps were tested and the results are presented in Tables 1 and 2 below.

TABLE 1

Permanent Set Test

| Sample | Initial Length | Length Under 25 lb Load | | Actual Weight (lb) | Max Stretch | Length After 120 hr | Permanent Set | Pass/Fail |
| --- | --- | --- | --- | --- | --- | --- | --- | --- |
| | | 0 Hour | 120 Hours | | | | | |
| 1 | 16.0" @ 5.12 lb | 16.25" | 16.38" | 25.08 | 0.38" | 16.13" | 0.13" | Pass |
| 2 | 16.0" @ 5.14 lb | 16.25" | 16.38" | 25.08 | 0.38" | 16.13" | 0.13" | Pass |
| 3 | 16.0" @ 5.36 lb | 16.25" | 16.38" | 25.20 | 0.38" | 16.13" | 0.13" | Pass |
| 4 | 16.0" @ 5.16 lb | 16.25" | 16.38" | 25.52 | 0.38" | 16.13" | 0.13" | Pass |

As evidenced by Table 1, the test hose straps were able to support the 25 lb load for 120 hours with a permanent set not exceeding 0.5 inches. The hose strap of the present invention is able to achieve a permanent set of less than 0.4 inches, preferably, less than 0.3 inches, and more preferably, less than 0.15 inches.

TABLE 2

Maximum Load Test

| Sample | Length Base Measurement | Length Under 300 lb/Stretch* | Time For 10 Loads (Minute) | Length After Load 10 Times | Permanent Set | Pass/Fail |
| --- | --- | --- | --- | --- | --- | --- |
| 1 | 25.34" | 39.25"/13.91" | 15 | 25.84" | 0.50" | Pass |
| 2 | 25.38" | 38.88"/13.50" | 16 | 25.88" | 0.50" | Pass |
| 3 | 25.38" | 39.00"/13.62" | 15 | 25.88" | 0.50" | Pass |
| 4 | 25.38" | 39.75"/14.39" | 15 | 25.88" | 0.50" | Pass |

*Actual load used weighed 301.7 lbs.

As evidenced by Table 2, the test hose straps were able to support 301.7 lbs for the required period of time and repetitions, and the permanent set did not exceed 0.5 inches. By further testing, it was discovered that the hose strap of the present invention is able to lift over 300 lbs without breakage, preferably, it is able to lift 400 lbs, and more preferably, 500 lbs.

The foregoing description of the preferred embodiments is not to be deemed as limiting the invention, which is defined by the appended claims. Each of the appended claims which are dependent claims recite features in addition to the features of the independent claim, and in preferred embodiments, one or more of said additional features may be combined together.

What is claimed is:

1. A hose strap for a railway car brake line, comprising:
   a flexible strap having a plurality of substantially identical oblong through holes positioned in a row lengthwise along the strap so that a longitudinal axis of the oblong through holes coincides with a longitudinal axis of the strap; and
   two one-piece metal clips attached respectively to opposite ends of the strap;
   wherein each clip comprises a first leg and a second leg extending from a major bend, each said first and second leg extending completely through adjacent through holes in the strap, the distance between said first and second leg along the longitudinal axis of the strap being greater than the distance, between identical points on two adjacent through holes along the same axis.

2. A hose strap according to claim 1, wherein an end of the first leg of each clip extends through a through hole; and bends around the second leg in a direction away from the major bend and toward the flexible strap.

3. The hose strap according to claim 1, wherein an end of the second leg of each clip extends through a through hole and bends about 90 degrees in a direction toward the major bend of the clip.

4. The hose strap according to claim 1, wherein the through holes are beveled.

5. The hose strap according to claim 1, having two through holes at one end of the strap and between 6 holes and 12 holes on the opposite end.

6. The hose strap according to claim 1, wherein the distance between the legs of each clip is greater than the distance between identical points on adjacent through holes by about 0.2 inches to about 0.75 inches on the longitudinal, axis before a load is applied to the strap.

7. The hose strap according to claim 1, wherein identical points on adjacent through holes are separated by a distance of 1 inch or less on the longitudinal axis.

8. The hose strap according to claim 1, wherein the flexible strap is thicker at the longitudinal axis than at the sides, thickness being measured in a direction perpendicular to the longitudinal axis of the flexible strap.

9. The hose, strap according to claim 1, wherein the second leg is load bearing after application of a load and displacement of the clip by a distance of about 0.2 inches to about 0.75 inches in the direction of the load.

10. The hose strap according to claim 1, exhibiting a permanent set of less than ½ inch upon applying a load, of 25 lbs for 120 hours, according to AAR Standard S-4006.

11. The hose strap according to claim 1, exhibiting a maximum load before failure of greater than 300 lbs, according to AAR Standard S-4006.

* * * * *